US012691389B1

(12) United States Patent
McCauley

(10) Patent No.: US 12,691,389 B1
(45) Date of Patent: Jul. 28, 2026

(54) SYSTEM AND METHOD FOR WATER DISTILLATION

(71) Applicant: VERONAPURE, LLC, Carson City, NV (US)

(72) Inventor: Jack Jean McCauley, Sunol, CA (US)

( * ) Notice: Subject to any disclaimer, the term of this patent is extended or adjusted under 35 U.S.C. 154(b) by 0 days.

(21) Appl. No.: 19/174,738

(22) Filed: Apr. 9, 2025

Related U.S. Application Data

(60) Provisional application No. 63/776,109, filed on Mar. 22, 2025.

(51) Int. Cl.
*C02F 1/04* (2023.01)
*B01D 3/02* (2006.01)
*B01D 5/00* (2006.01)

(52) U.S. Cl.
CPC ............. *B01D 5/0018* (2013.01); *B01D 3/02* (2013.01); *B01D 5/0051* (2013.01); *B01D 5/0054* (2013.01); *B01D 5/006* (2013.01); *C02F 1/043* (2013.01); *C02F 2201/005* (2013.01); *C02F 2209/02* (2013.01); *C02F 2209/42* (2013.01)

(58) Field of Classification Search
CPC .. B01D 5/0018; B01D 5/0051; B01D 5/0054; B01D 5/006; B01D 3/02; C02F 1/043
See application file for complete search history.

(56) References Cited

U.S. PATENT DOCUMENTS

| | | | | |
|---|---|---|---|---|
| 1,026,592 | A | | 5/1912 | Mackay |
| 3,340,157 | A | * | 9/1967 | Weiss ...................... C02F 1/045 |
| | | | | 202/180 |
| 3,507,753 | A | * | 4/1970 | Jacuzzi ................... C02F 1/048 |
| | | | | 203/10 |
| 4,089,750 | A | * | 5/1978 | Kirschman .............. B01D 3/00 |
| | | | | 202/180 |
| 4,219,387 | A | * | 8/1980 | Gruntman ................ C02F 1/14 |
| | | | | 210/918 |

(Continued)

*Primary Examiner* — Jonathan Miller
(74) *Attorney, Agent, or Firm* — Patrick Reilly

(57) ABSTRACT

A condensing system has a boiler system, a tubing assembly, a condenser, and a control module. The condenser comprises a cycloid piston moveably positioned within a condenser vessel. The cycloid piston includes a cycloid wall that extends down from an internally formed a three dimensional cycloid surface, i.e. a tautochrome. The control module includes a control logic communicatively coupled with a boiler heater of the boiler system, a boiler temperature sensor, a condenser temperature sensor, and a strain gauge scale The tubing assembly provides a pathway for the steam to travel from the boiler system to the condenser. The control system controls the boiler heater in view of temperature readings of the boiler temperature sensor. The control system imposes one or more temperature pre-heating gradients in heating the volume of water before the boiling point of water is reached. The effluent vapors that escape the boiler during the course of the temperature pre-heating gradient(s) have a lower boiling point than that of the volume water. These effluent vapors exit from the boiler as their respective boiling points are imposed on the volume of water, and escape via a check valve. Readings from the boiler temperature sensor and the condenser temperature sensor are applied by the control logic to determine an observed boiling point of the volume of water.

20 Claims, 8 Drawing Sheets

(56) References Cited

U.S. PATENT DOCUMENTS

| | | | | |
|---|---|---|---|---|
| 4,687,550 | A * | 8/1987 | Wong | B01D 3/02 |
| | | | | 203/1 |
| 5,215,448 | A | 6/1993 | Cooper | |
| 5,368,698 | A * | 11/1994 | Field | C02F 1/04 |
| | | | | 202/195 |
| 5,565,065 | A * | 10/1996 | Wang | B01D 1/0017 |
| | | | | 202/180 |
| 5,885,313 | A * | 3/1999 | Okamoto | B01D 3/4205 |
| | | | | 165/110 |
| 7,897,019 | B2 * | 3/2011 | Akers | B01D 1/14 |
| | | | | 261/153 |
| 9,162,159 | B2 * | 10/2015 | Hsia | B01D 5/0018 |
| 9,428,403 | B2 * | 8/2016 | Haynes | B01D 1/0094 |
| 9,771,278 | B2 * | 9/2017 | Haynes | B01D 1/0035 |
| 9,938,162 | B2 * | 4/2018 | Reda | B01D 3/10 |
| 10,493,374 | B2 * | 12/2019 | Wells | B01D 5/0003 |
| 10,829,913 | B1 * | 11/2020 | Ahmed | B01D 61/025 |
| 10,926,188 | B2 * | 2/2021 | Martin | B01D 5/006 |
| 10,953,341 | B2 * | 3/2021 | Joseph, III | B01D 1/0035 |
| 11,612,830 | B2 * | 3/2023 | Shelander | B01D 3/32 |
| | | | | 202/190 |
| 2002/0179425 | A1 * | 12/2002 | Dableh | B01D 5/0036 |
| | | | | 203/1 |
| 2010/0032280 | A1 * | 2/2010 | Akers | B01D 5/006 |
| | | | | 202/234 |
| 2012/0228114 | A1 * | 9/2012 | Joseph, III | C02F 1/14 |
| | | | | 202/180 |
| 2013/0161180 | A1 * | 6/2013 | Brown | C02F 1/14 |
| | | | | 202/187 |
| 2014/0238836 | A1 * | 8/2014 | Hsia | B01D 5/0018 |
| | | | | 202/185.1 |
| 2016/0251236 | A1 * | 9/2016 | Reda | C02F 1/008 |
| | | | | 203/11 |
| 2016/0368784 | A1 * | 12/2016 | Haynes | B01D 1/305 |
| 2020/0282326 | A1 * | 9/2020 | Martin | B01D 1/0035 |

* cited by examiner

500

SYSTEM AND METHOD FOR WATER DISTILLATION

CO-PENDING APPLICATION

This Nonprovisional Patent Application is a Continuation-in-Part Patent Application to Provisional Patent Application Ser. No. 63/776,109 as filed on Mar. 24, 2025, by Inventor Jack Jean MCCAULEY. Provisional Patent Application Ser. No. 63/776,109 is hereby incorporated into its entirety and for all purposes into the present disclosure. The benefit of the Priority Date of Mar. 24, 2025, of Provisional Patent Application Ser. No. 63/776,109 is claimed for this Nonprovisional Patent Application.

INCORPORATION BY REFERENCE

All publications, patents, and patent applications mentioned in this specification are herein incorporated by reference in their entirety and for all purposes to the same extent as if each individual publication, patent, or patent application was specifically and individually indicated to be incorporated by reference, including U.S. Pat. No. 1,026,592A issued on May 14, 1912, to Inventor Robert Mackay; U.S. Pat. No. 5,215,448 issued on Jun. 1, 1993, to Inventor Paul Cooper.

FIELD OF THE INVENTION

The present invention is related generally to methods and system for distillation, and more particularly to separation of impurities including effluents from liquid solutions.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The widely used and a classic prior art distillation method uses a condenser coil and a heat transfer jacket. There are several problems and limitations this prior art method. One weakness of prior art distillation systems and techniques is that low boiling point volatiles in the source water will intermingle as vapors in any steam produced; whereby at least some of these volatiles condense with the steam and end up back in the vessel to contaminate the distilled water.

Most urgently, a dependable source of clean water eludes vast segments of humanity. For example, the Canadian International Development Agency reports that about 1.2 billion people lack access to safe drinking water. Published reports attribute millions and millions of deaths per year, mostly children, to water related diseases.

More work would be required to quantify the current and expanded market in dollar terms, but the present invention is believed to clearly change the energy usage estimation and price analysis for distiller such systems and devices, as desirable in countertop coffee makers, cafes and restaurants, various methods of distilling alcoholic and non-alcoholic beverages, pharmaceutical production, community water systems, to address the needs of occupants in remote, and to be integrated into systems, and various process steps and methods of distilling solvents other than water.

Focusing on water purification, many such techniques are well known, including carbon filters, chlorination, pasteurization, and reverse osmosis. Many of these techniques are significantly affected by variations in the water quality and do not address a wide variety of common contaminants, such as bacteria, viruses, organics, arsenic, lead, mercury, and pesticides that may be found in water supplies in the developing world and elsewhere. Some of these systems require access to a supply of consumables, such as filters or chemicals. Moreover, some of these techniques are only well suited to centralized, large-scale water systems that require both a significant infrastructure and highly trained operators. The ability to produce reliable clean water with accessible electrical energy sources and requirements without regard to the water source, on a smaller, decentralized scale, without the need for consumables and constant maintenance is very desirable, particularly in the developing world. The use of vapor compression distillation to purify water is well known and may address many of these concerns. However, the poor financial resources, limited technical assets, and low population density that does not make it feasible to build centralized, large-scale water systems in much of the developing world, also limits the availability of adequate, affordable, and reliable power to operate vapor compression distillation systems, as well as hindering the ability to properly maintain such systems. In such circumstances, an improved vapor compression distillation system and associated components that increases efficiency and production capability, while decreasing the necessary power budget for system operation and the amount of system maintenance required may provide a solution.

In just one aspect of the clean water market, it is safe to say that the countertop distiller market as-is is large enough to support several companies. Indirect competition includes bottled water, the Brita pitcher, the PUR faucet mount, and several more complex inline reverse osmosis systems. Clean drinking water is a mass market. If the technology proposed here disrupts the countertop distiller market, it could have the potential to capture a portion of the indirect market.

It is understood that the method of the present invention is applicable for distilling water and liquids, and solvents. It is therefore an object of the present to provide a system and method for distilling water and liquids, and solvents.

BRIEF SUMMARY OF THE INVENTION

Towards these and other objects of the method of the present invention (hereinafter, "the invented method") that are made obvious to one of ordinary skill in the art in light of the present disclosure, the invented method provides a first preferred embodiment of the present invention that comprises a boiler system, a tubing assembly, a condenser, and a control module. The tubing assembly provides a gas pathway for the steam (and undesirably possibly some effluent vapors) to travel from the boiler system to the condenser. The control module includes a control logic communicatively coupled with a boiler heater of the boiler system, a boiler temperature sensor, a condenser temperature sensor, and a strain gauge scale.

The condenser comprises a cycloid piston moveably positioned within a condenser vessel. The cycloid piston includes a cycloid wall that extends down from an internally formed three dimensional cycloid surface, i.e. a tautochrome, (hereinafter, "the cycloid") such that a center point of the cycloid surface is preferably positioned at the highest point of the cycloid along a z-axis, i.e., relative to the direction and source of gravity, and the cycloid curves downwards along the z-axis in 360 degrees from and around the center point. Alternatively or additionally, the cycloid may fail to adhere in sections or elements to the cycloid surface, i.e., presenting or forming an imperfect three dimensional cycloid.

The boiler system includes a boiler that holds a volume of water that contains undesirable effluents, e.g., pollutants. The control system controls the boiler heater in view of temperature readings of the boiler temperature sensor. The control system imposes one or more temperature pre-heating gradients in heating the volume of water before the boiling point of water is reached. The effluent vapors that escape the boiler during the course of the temperature pre-heating gradient have a lower boiling point than that of the volume water.

These effluent vapors exit from the boiler as their respective boiling points are imposed on the volume of water, and escape via a check valve positioned at an end of a first section of the tubing assembly.

There is a check valve located on the tubing assembly between the boiler and the condenser vessel. The check valve is open during the course of the pre-heat gradient[s]. After the completion of the preheat gradient, the control system directs the boiler heater to raise the temperature of the water to a boiling point, which can self-adjust for altitude. Steam thereafter released into the tubing assembly creates pressure that closes the check valve.

More particularly, as the volume of water is heated by the boiler heater, the logic circuit, directs the boiler heater to increase the water temperature through the one or more temperature gradients, for instance at 165 degrees F., and maintains that temperature for a preset period of time, for example 10 minutes. These time-based temperature gradients with stabilized temperature time periods allows the check valve to out gas certain effluents as vapors. As the water temperature increases to the local boiling point of water, e.g., 212 F, steam pressure in the tubing assembly between the boiler and condenser vessel causes the check valve to close.

The steam then exiting from the boiler system, and possibly certain remaining effluent vapors, enters the cycloid piston preferably via a condenser aperture located at the bottom of a condenser vessel after travelling through a pathway of the tubing assembly. The gas pathway includes a second section of the tubing assembly from the boiler and part of the first section of the tubing assembly, wherein the said first part of the first section extends from the boiler to the input area of the now closed check valve.

There is preferably a fan positioned to blow cool air down onto the cycloid piston to remove heat via the cooling fins. As the steam enters the condenser and accumulates inside the cycloid piston, the steam condenses into hot water, and the steam drives out all of the air that was in the cycloid piston and as the hot water accumulates, the cycloid piston begins to float upward towards the cooling fan thus allowing the cooling fins on the cycloid piston to better contact cool air from the fan.

The principle of the cycloid steam pump is found in the expansion factor of steam. One cubic inch of water will expand to 1100 cubic inches of steam and thus always condensing into hot water of smaller volume inside the cycloid piston to create a vacuum effect. While the cycloid piston is sufficiently full of steam, the cycloid piston acts as a pump drawing steam from the boiler system 2, through the tubing assembly and into to the cycloid condenser vessel.

The water inside the condenser can get very hot e.g., 192 F. Whatever effluents were not initially removed via the gradient control and the check valve, will preferably be cooked out of the condenser and blown away from the condenser by air driven into the gap by the cooling fan. As mentioned before, the condenser vessel has an inside clearance in relation to the cycloid piston. This clearance forms the gap that allows gasses to escape from the cycloid piston through the gap, i.e., between an inside wall of the condenser vessel and an exterior of the cycloid piston. The cycloid piston is preferably movable along the z-axis without contacting the condenser vessel. These effluent vapors pass up through the gap and further away from the cycloid via a manifold surrounding the fan. The strain gauge scale measures the weight of the condensed water in the condenser and informs the control logic when the condenser is full of a maximum weight of condensed water, whereupon the control logic turns off the boiler heater.

In certain additional alternate preferred embodiments of the cycloid surface define a cycloid surface having a tolerance within +/−3% of a radius of a circle that could be used to shape a hemispheric embodiment of the cycloid surface; certain other alternate preferred embodiments of the cycloid surface define a cycloid surface having a tolerance within +/−3.00% of a radius of a circle that could be used to shape a hemispheric embodiment of the cycloid surface; and certain other additional alternate preferred embodiments of the cycloid surface define a cycloid surface having a tolerance within +/−0.05% of a radius of a circle that could be used to shape a hemispheric embodiment of the cycloid surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The detailed description of some embodiments of the invention is made below with reference to the accompanying figures, wherein like numerals represent corresponding parts of the figures.

DETAILED DESCRIPTION OF THE INVENTION

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Throughout this specification, like reference numbers signify the same elements throughout the description of the figures.

Figure 1A:
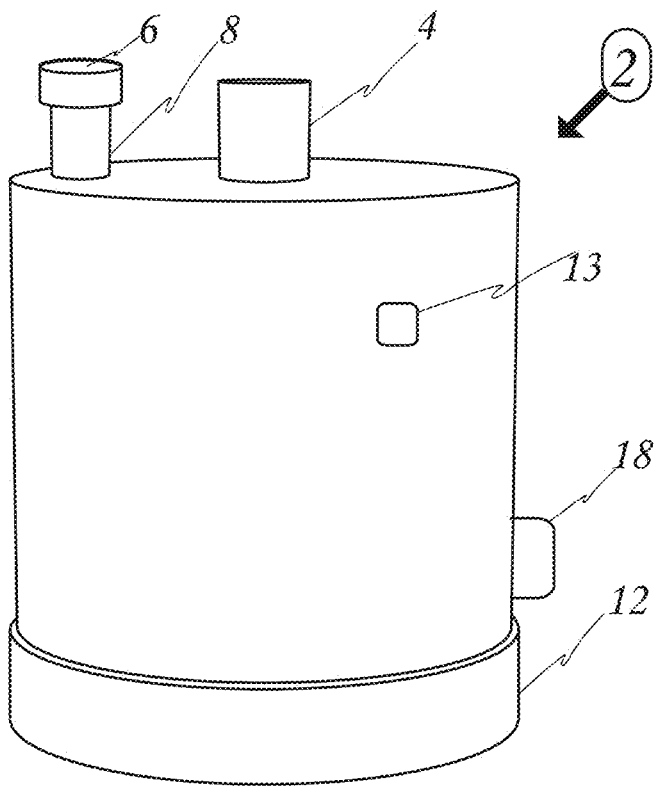
FIG. 1A is a perspective view comprising a boiler system of a first preferred embodiment of the present invention (hereinafter, "the first system")
Figure 1B:
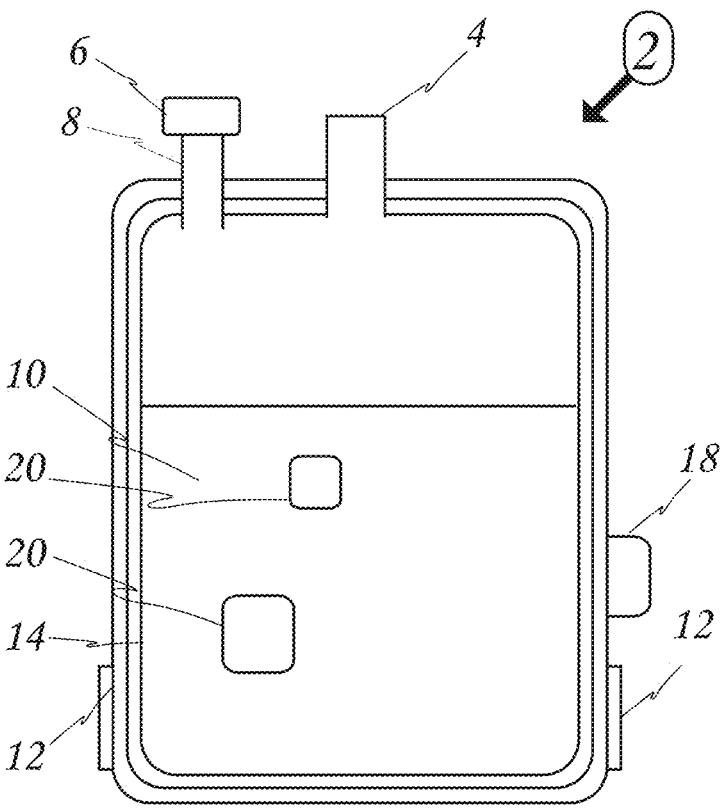
FIG. 1B is a cutaway side view of the boiler system of FIG. 1A.
Figure 1C:
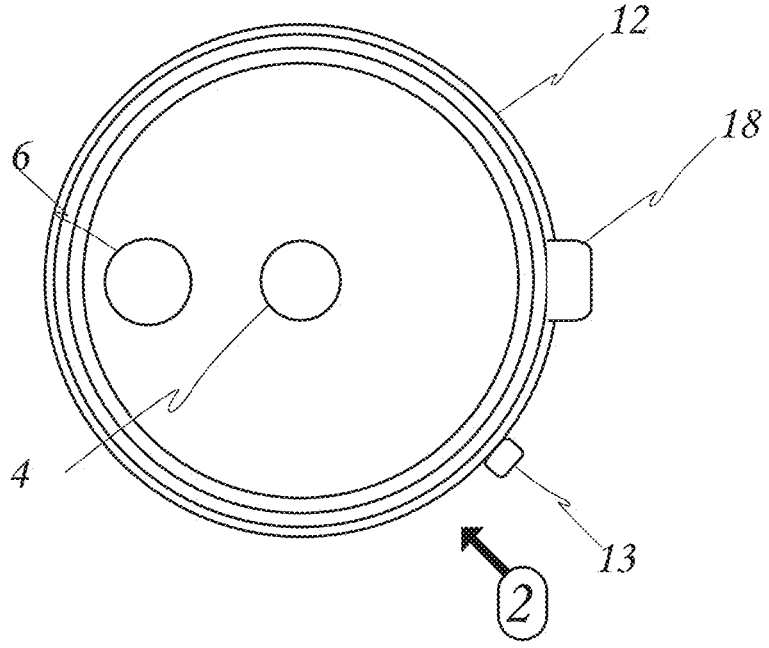
FIG. 1C is a top view of the boiler system of FIG. 1A.

Referring now generally to the Figures and particularly to FIGS. 1A, 1B and 1C, FIG. 1A is a perspective view of boiler system 2 shown in respect to a vertical Z-axis and that comprises a boiler steam outlet 4, a removable and re-attachable cap (hereinafter, "the cap 6") that alternately (a.) attaches to a water inlet 8 of a boiler system 2 to isolate the boiler system 2 from the ambient atmosphere (not shown), and (d.) de-attaches from the boiler system 2 to enable deliveries of an input volume of source water 10 (hereinafter, "the source water 10") into the boiler system 2. The vertical Z-axis has directionality as a downward direction extends along the Z-axis, e.g., from the cap 6 when attached to the water inlet 8 and towards a band boiler heater 12 (hereinafter, "boiler heater 12"). A boiler status light emitting diode 13 (hereinafter, "the boiler status LED 13") is used as disclosed in reference to FIG. 5 and FIG. 6.

As shown on FIG. 1B the boiler system 2, presented in respect to the Z-axis, that has an internal coating 14 that limits or removes any introduction of impurities into the source water 10 from the boiler system 2. The internal coating 14 may be or comprise a chemically inert material, such as an ECLIPSE™ reinforced coating marketed by internal Industries headquarters located at One internal Place, Pittsburgh, Pennsylvania, or other suitable coating known in the art that reduces contamination of the source water 10. An exemplary boiler heater 12 of the boiler system 2 and a Positive Temperature Coefficient Sensor 18 (hereinafter, "the boiler temperature sensor 18") is attached to the boiler system 2.

Referring now generally to the Figures and particularly to FIG. 1B, FIG. 1B is a cutaway side-view of the boiler system 2 showing the position of the boiler steam outlet 4 and the cap 6 attached to the water inlet 8 and thereby sealing the boiler system 2 from, and to limit contamination of, the source water 10 by the ambient air. It is understood that removing the cap 6 from the boiler system 2 exposes a pathway through the inlet 8 for source water 10 into the boiler system 2 and into contact with the internal coating 14. The exemplary boiler heater 12 surrounds the boiler system 2 and heats the source water 10 to both release (a.) a plurality effluents 20 (hereinafter, "the effluents 20") as an effluent vapor 22. It is understood that certain of the effluents 20 contained in the source water 10 have lower boiling points than the source water 10, and (b.) preferably thereafter to release the source water 10 as a steam 24. Both the effluent vapor 22 and the steam 24 exit the boiler system 2 via the boiler steam outlet 4.

Referring now generally to the Figures and particularly to FIG. 1C, FIG. 1C is a top view of the boiler system 2, presented in respect to an X-Y plane that is orthogonal to the vertical Z-axis, and presents the boiler heater 12 positioned around and external to the boiler system 2. The boiler temperature sensor 18 is shown to be attached externally to the boiler system 2; the cap 6 is shown as attached to the boiler system 2; and the boiler steam outlet 4 is shown to extend upwards from the boiler system 2.

Figure 2:
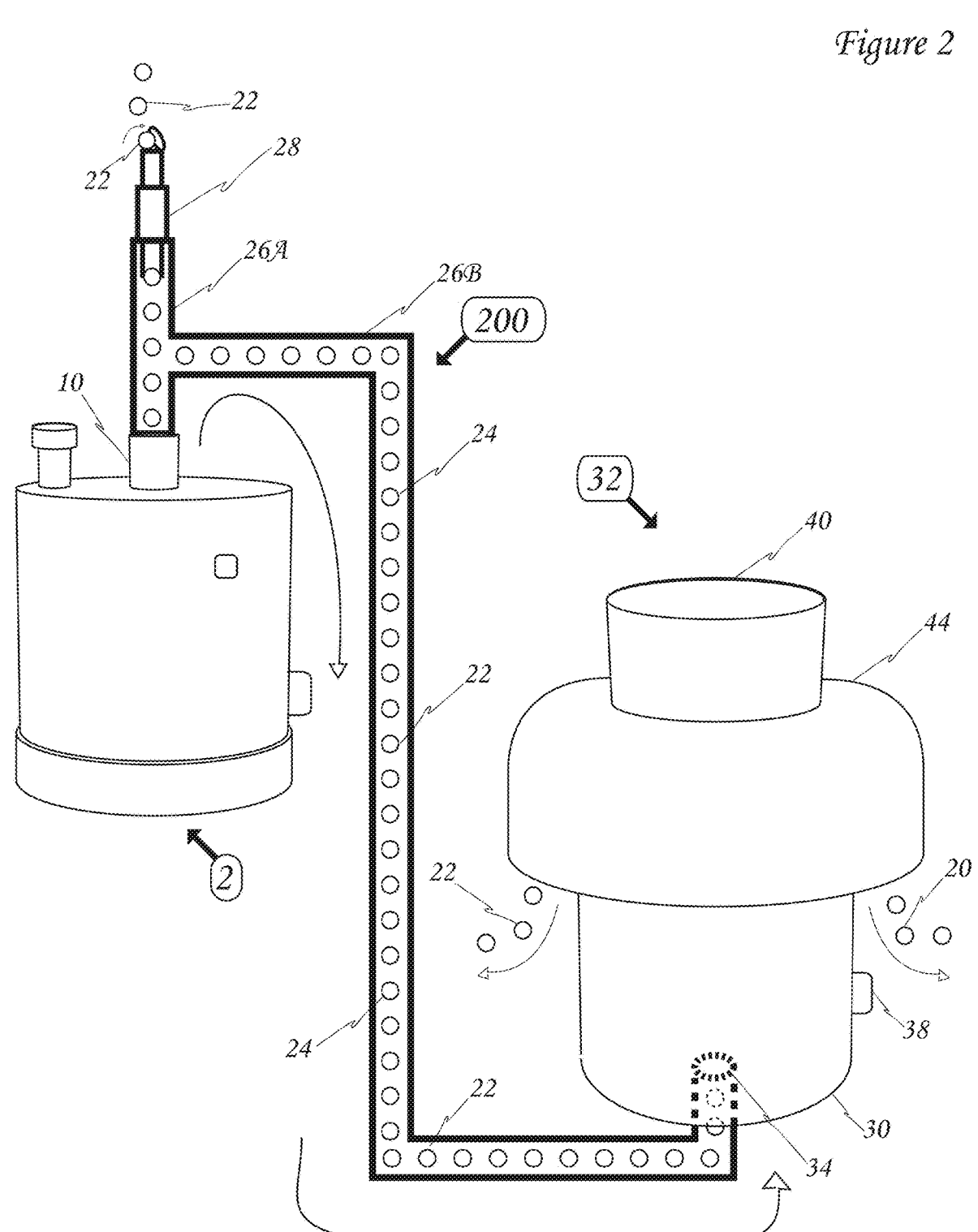
FIG. 2 is a perspective view of the first system comprising the boiler system of FIGS. 1A, 1B and 1C, a tubing assembly, and a condenser.

Referring now generally to the Figures and particularly to FIG. 2, FIG. 2 is an illustration of a first preferred embodiment of the present invention 200 (hereinafter, "the first system 200") comprising the boiler system 2, a first borosilicate steam tube first section 26A and that houses an effluent check valve 28, and another borosilicate steam tube second section 26B that is further coupled to a cycloid condenser vessel 30 of a cycloid condenser 32 via a condenser aperture 34 located at the bottom of the cycloid condenser vessel 30. The check valve 28 is or comprises a ⅜" 10 mm Inline vacuum Barbed Check 8™ one way water non-return breather check valve for fuel, gas, liquid, and air as marketed by the Wuhan Beite Bai Electronic Commerce Co. LTD of Hongshan, Wuhan, People's Republic of China 430072, or other suitable check valve known in the art.

Figure 4:
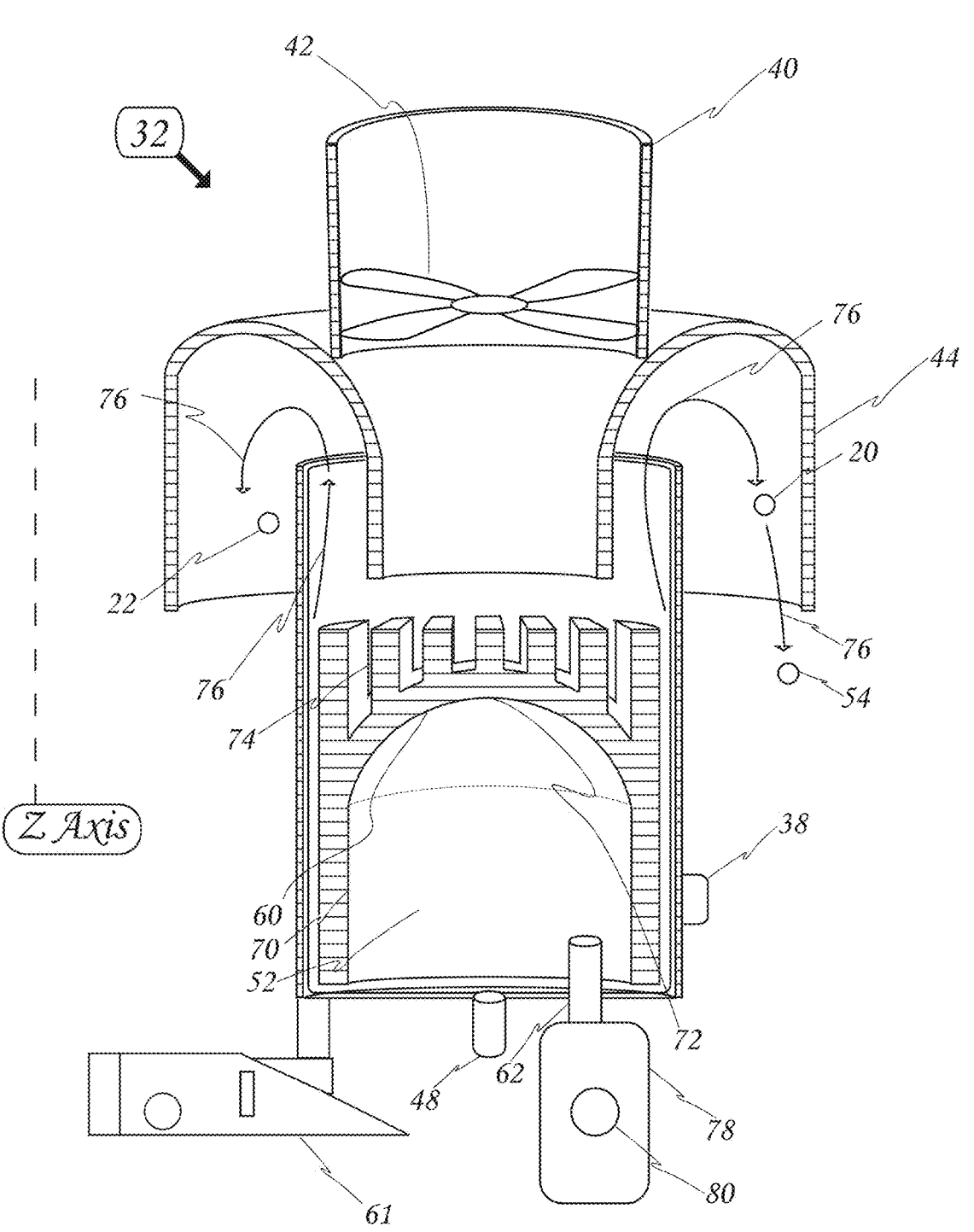
FIG. 4 is a detailed cutaway sideview of the cycloid piston of the condenser of FIG. 2 in place within the condenser.

According to the invented method, the heated effluent vapor 22 initially passes from the boiler system 2 by means of a borosilicate steam tube first section 26A and out of an effluent check valve 28, wherein the effluent check valve 28 is initially in an open state. The source water 10 is then further heated to its boiling point and transitions into steam 24; the steam 24 passes onto the borosilicate steam tube first section 26A, and at some point, applies enough steam pressure to force the effluent check valve 28 from the initial open state to a closed state. The steam 24 and any additionally generated effluent vapor 22 thereafter pass through the borosilicate steam tube second section 26B, and thereby into the cycloid condenser vessel 30. A cycloid temperature sensor 38 (hereinafter, "the cycloid temperature sensor 38") monitors the instantaneous temperature of the cycloid condenser vessel 30. A fan inlet 40 houses a cooling fan 42 (as shown in FIG. 4), that provides momentum to drive effluent vapor 22 through a coupled effluent exhaust shroud 44 and out of the cycloid condenser 32, as discussed further below.

Figure 3:
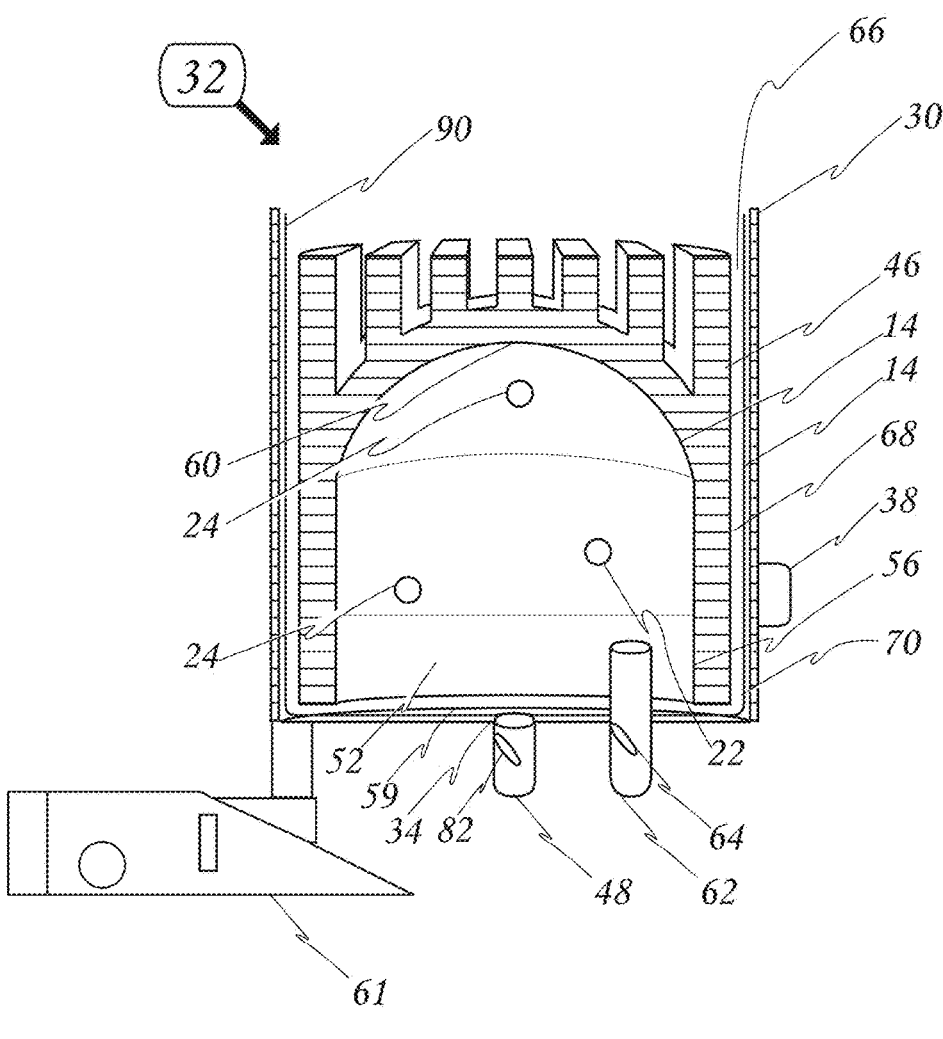
FIG. 3 is a detailed cutaway sideview of the cycloid piston of the condenser of FIG. 2

Referring now generally to the Figures and particularly to FIG. 3, FIG. 3 is a partial cutaway side view of the cycloid condenser 32 that comprises a cycloid piston 46 and the cycloid condenser vessel 30. The steam 24 and possibly with a certain undesirable amount of effluent vapor 22 enters into the cycloid piston 46 via the a condenser steam inlet 48 that extends through the condenser aperture 34 (as shown in FIG. 2), whereupon the steam 24 passes further through the condenser steam inlet 48 and rises to contact a cooled condensing cycloid surface 60. The steam 24 then condenses back into a volume of condensed water 52. The condensed water 52 then flows downward and along a vertical piston wall extension internal side 56 of a piston extension wall 58 of the cycloid piston 46 and towards a condensed water 52 gathered upon an internal floor 59 of the cycloid condenser 32. One cubic inch of the condensed water 52 will expand to 1100 cubic inches of steam 24 and thus always condensing into a condensed water 52 of exceedingly smaller volume inside the cycloid piston 46 to create a vacuum effect; this vacuum effect causes force to be applied through the two borosilicate steam tube sections 26A & 26B, of FIG. 2, to pull additional steam 24 and undesired effluent vapors 22 from the boiler system 2 and into the cycloid condenser vessel 30 and the piston extension wall 58 of the cycloid piston 46.

A strain gauge scale 61 is calibrated to determine when a weight of the cycloid condenser 32 meets or exceeds a maximum weight value CCmax. The cycloid condenser maximum weight value CCmax indicates to the control system 500 of FIG. 5 that the boiler heater 12 shall be turned off to limit the amount of additional steam 24 that will thereafter be directed through the first and second borosilicate steam tube sections 26A & 26B and into the cycloid condenser 32. The condenser water outlet 62 preferably has a manual ON/OFF valve (not shown that has an open and a closed state, wherein (a.) in the closed state condensed water 52 is inhibited from flowing out of the cycloid condenser 32; and (b.) in an open state the condensed water 52 is enabled to flow out of the cycloid condenser 32. Alternatively or additionally, the condenser water outlet 62 preferably has an electronically controllable dispenser ON/OFF valve 64 that has an open and a closed state, wherein (a.) in the closed state the condensed water 52 is inhibited from flowing out of the cycloid condenser 32; and (b.) in an open state the condensed water 52 is free to flow out of the cycloid condenser 32.

The condensed water 52 inside the cycloid condenser 32 can get very hot, e.g., approaching 192 F and above. Most effluents 20 that were not initially removed from the first and second borosilicate steam tube sections 26A & 26B via the effluent check valve 28 during a heating within the gradient control preheating will preferably be cooked out of the cycloid condenser 32, and the effluent vapors 22 will be blown out of the effluent exhaust shroud 44 by a combination of (a.) being forced toward and down the piston wall extension internal side 56 by the hotter steam 24; and (b.) air pressure generated outside of the cycloid piston 46 by the cooling fan 42 and forced down a gap 66 formed between (i.) a piston wall vertical external side 68, and (ii.) an inner vessel wall 70 of the cycloid condenser vessel 30, wherein the air pressure is generated outside of the cycloid piston 46 by the cooling fan 42. The gap 66 is formed by a deliberate oversizing of the inner vessel wall 70 relative to the piston wall vertical external side 68 wherein an inner circumference of the inner vessel wall 70 is preferably in the range of 0.01% 10% larger, or more preferably in the range of 0.1% to 5% larger than an outer circumference of the piston wall vertical external side 68.

Figure 5:
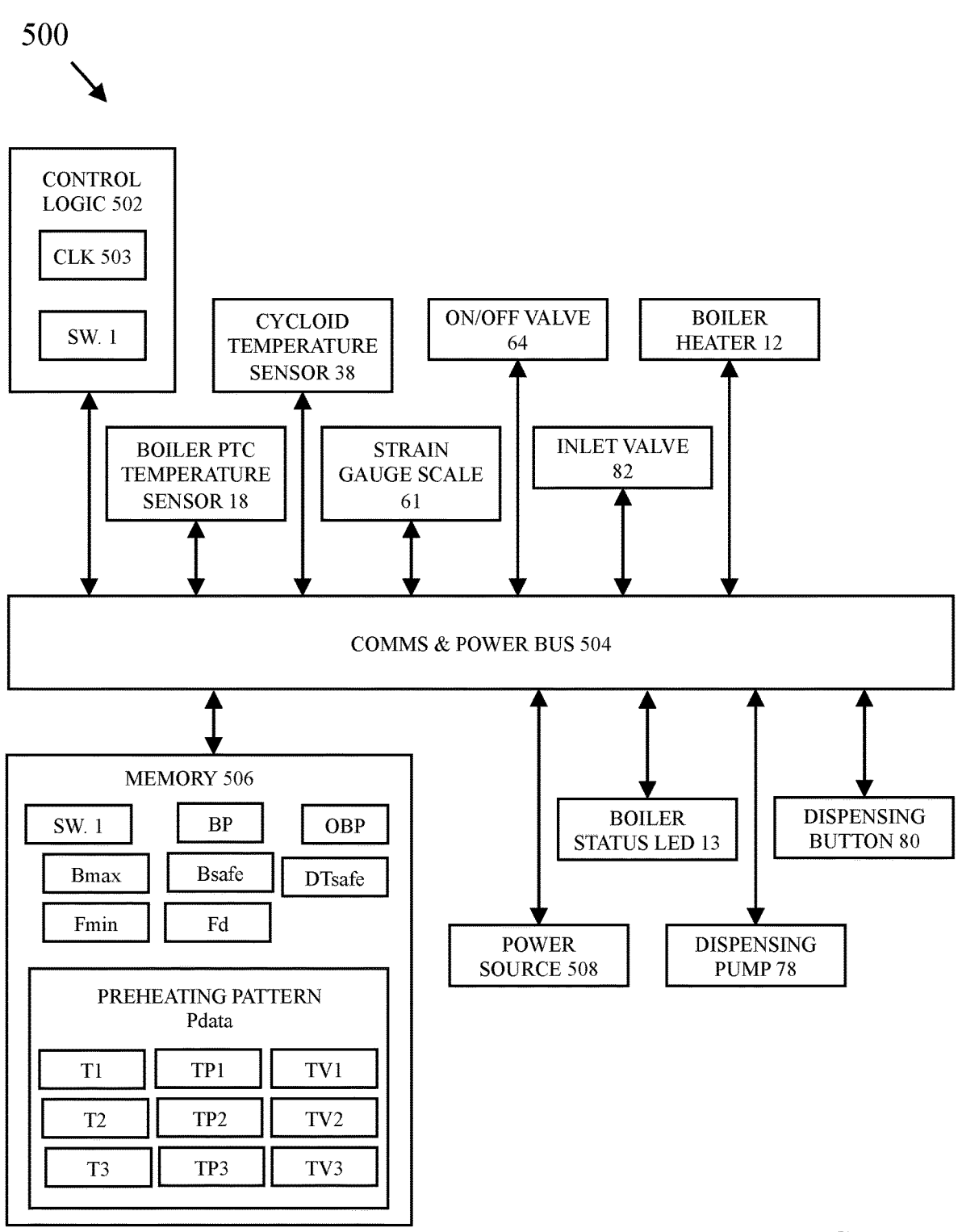
FIG. 5 is a block diagram of an electronic control system of the first system of FIG. 2.

The strain gauge scale 61 measures the weight of the cycloid condenser 32 and optionally informs a control system 500, as per FIG. 5. The control system 500 is configured to turn the boiler heater 12 off when the cycloid condenser 32 is full of a pre-selected maximum weight of condensed water 52, as indicated by parametric readings generated by the small strain gauge scale 61.

It further is understood that the cycloid piston 46, and the cycloid vessel condenser 30 are each preferably internally lined with the internal coating 14. It is further understood both the internal side 56 and the external side 68 piston extension wall 58 of the cycloid piston 46 are each preferably internally lined with the internal coating 14.

Figure 6:
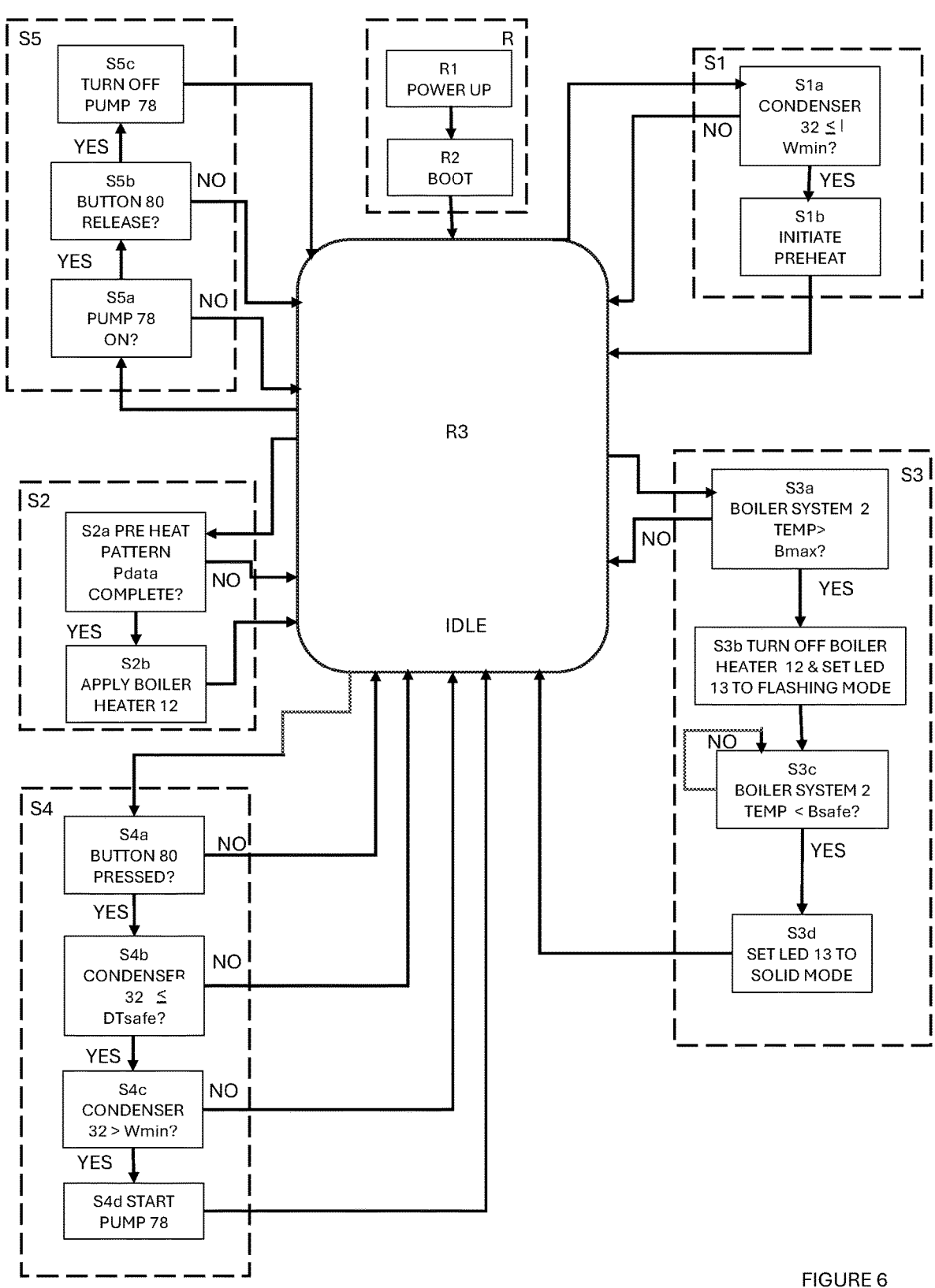
FIG. 6 is a state machine diagram of the first system of FIG 2.

The cycloid temperature sensor 38 is applied to monitor the instantaneous temperature of the cycloid condenser vessel 30, as detailed in the detailed description of FIGS. 5 and 6

Referring now generally to the Figures and particularly to FIG. 4, FIG. 4 is a cutaway side view of the cycloid condenser 32 wherein a center point 72 of the cycloid surface 60 is indicated to be the highest point of the cycloid surface 60 along a vertical axis Z that is defined being parallel as the direction of the pull of the Earth's gravity.

It is understood that the cycloid surface 60 preferably extends down from the center point 72 as the highest point and within a 360 degree range circling the center point 72 to form, or at least partially form, a tautochrome. Alternatively or additionally, the cycloid surface 60 may fail to adhere in sections or elements, i.e., presenting or forming an imperfect three dimensional tautochrome.

Certain alternate preferred embodiments of the cycloid surface 60 preferably have a tolerance within +/−3% of a geometrically ideal tautochrome; certain yet alternate preferred embodiments of the cycloid surface 60 preferably have a tolerance within +/−1% of a geometrically ideal tautochrome; and certain even alternate preferred embodiments of the cycloid surface 60 preferably have a tolerance within +/−0.05% of a geometrically ideal tautochrome.

Certain other alternate preferred embodiments of the cycloid surface 60 preferably have a tolerance within +/−3% of a geometrically ideal hemisphere; certain yet alternate preferred embodiments of the cycloid surface 60 preferably have a tolerance within +/−1% of a geometrically ideal hemisphere; and certain even alternate preferred embodiments of the cycloid surface 60 preferably have a tolerance within +/−0.05% of a geometrically ideal hemisphere.

The fan inlet 40 accepts ambient air for acceleration by the cooling fan 42 towards a plurality of external cooling fins 74 of the cycloid piston 46. The effluents vaper 20 forced from the cycloid piston 46 by the air pressure imposed by the cooling fan 42 and into the effluent exhaust shroud 44 follow an exit path 76 (we don't show 20 coming out of the shroud in the figures, we only show 22 and 54. suggestions?). The locations of the condenser steam inlet 48, condenser water outlet 62, the strain gauge scale 61, the cycloid condenser 32, a controllable dispenser pump 78, and a dispensing pump control button 80 and the cycloid temperature sensor 38 are presented in FIG. 4. The controllable dispenser pump 78 informs the control system 500 of FIG. 5 that the dispenser pump 78 should be directed to turn on and pump the condensed water 52 out of the cycloid condenser vessel 30. A controllable inlet valve 82 within the condenser steam inlet 48 is configured to controllably switch from an open state to a closed state upon receipt of a maximal weight Wmax reading from the strain gauge scale 61, whereby steam 24 and effluent vapors 22 flow through the condenser steam inlet 48 when the controllable inlet valve 82 is in the open state, and the steam and effluent vapors are impeded from flowing into the cycloid condenser vessel 30 when the controllable inlet valve 82 is in the closed state.

Referring now generally to the Figures and particularly to FIG. 5, FIG. 5 is a block diagram of the control system 500 that comprises a control logic 502 communicatively coupled via a power and communications bus 504 (hereinafter, "bus" 504), a digital memory circuit 506, an electrical power source 508, the boiler status LED 13, the dispenser output valve 64, the dispensing pump 78, the dispensing pump control button 80, the condenser inlet valve 82, the strain gauge scale 61, the cycloid PTC temperature sensor 38, and the boiler temperature sensor 18. A first software application first directs the control logic 502 to instantiate the aspects of the FIGS. 1 through 4 and of the state machine 600 of FIG. 6 as disclosed regarding FIGS. 1 through 4 and FIG. 6

It is understood that the control logic 502 may be or comprise control circuitry that may be implemented using hardware, software, firmware, or combinations thereof. In various embodiments of the present invention, the control logic 502 may include hardwired circuitry, such as application-specific integrated circuits, one or more programmable devices, such as microprocessors or microcontrollers executing software instructions stored in the memory circuit 504, reconfigurable devices, such as field-programmable gate arrays, or combinations thereof.

In various embodiments, the digital memory 506 may comprise or be implemented as (1.) series of stored values in any suitable medium; (2.) one or more digital memory integrated circuits, including but not limited to volatile memory (such as RAM, DRAM, SRAM), non-volatile memory (such as ROM, PROM, EPROM, EEPROM, flash memory), or combinations thereof; (3.) logic devices that are configurable or reconfigurable to store data values and/or software instructions readable by the control logic 502, including but not limited to field-programmable gate arrays (FINTERNALAs), complex programmable logic devices (CPLDs), or other programmable logic devices; (4.) any suitable combination of the above implementations; or (5) any other structure or medium capable of storing and providing access to data values and/or. Alternatively, the digital memory may be comprised within the control logic 502.

The control logic 502 and/or the digital memory 506 store the values of the preheating gradients Pdata that direct the control logic 501 to instantiate of one or more gradient temperatures, temperature variances and time periods of FIG. 6, such as (a.) one or more plateau temperature values, T1 T2, & T3; (b.) one or more specific time periods TP1, TP2, & TP3 during which the boiler heater 12 is to maintain associated temperature plateau values T1 T2, & T3, i.e., time gradient plateaus of the preheating phase; (c.) one or more and the variance temperature values, TV2, & TV3 within which the boiler heater 12 is to maintain during their respective temperature values T1, T2, & T3; (d.) a "too hot" boiler shut down temperature maximum temperature Bmax; (e.) an expected boiling point temperature BP; (f.) a most recently observed boiling point temperature measured value OBT; (g.) a safe handling temperature Bsafe of the boiler system 2; (g.) a safe temperature dispensing level DTsafe; (h) a first preset condenser weight minimal level Wmin; and (j.) a first preset condenser weight minimal level Wmax.

A control clock CLK of the control logic 502 enables the control logic 502 to count down through a duration of time periods, e.g., T1P1, TP2 & TP3, as required by the invented method.

Referring now generally to the Figures and particularly to FIGS. 5 and 6, FIG. 6 is a state machine diagram of the logic flow of a finite state machine 600 (hereinafter, "state machine 600") that is optionally instantiated by the present invention. It is understood that events, state transitions and the behavior of the state machine 600 can be represented in a graphical form, e.g., FIG. 6, that are known as state diagrams of finite state machines.

It is understood that the state machine 600 may be instantiated by execution of the control logic 502 of a plurality of programmed, configured, reprogrammable and/or reconfigurable instructions that in combination direct the control logic 502 to independently proceed with a power/boot stream R having an initial a power up state R1, to a boot state R2, and therefrom to an idle state R3.

The state machine 600 supports five independent looped state machine streams S1-S5 that are each independently performed or state maintained by one or more elements of the present invention 2, as specified in FIG. 6. The state machine 600 independently proceeds thereafter from the idle state R3 and along each of five state machine logic streams S1-S5 (hereinafter, "streams S1-S5"). These streams S1-S5 proceed in view of current states and when a particular relevant event is to be acted upon by the control logic 502 as directed by the software application SW.1.

In a first stream S1, the control logic 502 determines in an initial state S1*a* whether or not the strain gauge scale control logic 502 indicates that the weight of the cycloid condenser 32 is below a first preset weight minimal level Wmin (hereinafter, "the Wmin weight level"). When the strain gauge scale 61 does not indicate to the control logic 502 that the cycloid condenser 32 is below the Wmin weight level, the first stream S1 returns from state S1*a* to the idle state R3. In the alternative, if the strain gauge scale control logic 502 does indicate to the control logic 502 that cycloid condenser 32 is below the Wmin weight level, the control logic 502 proceeds from state S1*a* to state S1*b* and directs the boiler heater 12 to apply the preheating gradient pattern Pdata, and by referencing the temperature indications of the boiler PTC temperature sensor 18 present in the boiler system 2. After a completion of the preheating gradient pattern as directed by the control logic 502, the first stream S1 proceeds from state S1*b* to the idle state R3.

The preheating pattern Pdata is stored in and is applied by the control logic 502 and/or the memory 506 as in accordance with the first software application to monitor the boiler temperature sensor 18 to exercising a temperature gradient as per the stored values of temperature plateaus T1, T2 & T3 within a temperature variance TV1, TV2 & TV3 and for preset time periods TP1, TP2 & TP2. More particularly, the control logic 5102 enables the boiler heater 12 to heat the source water 10 to a first T1 as measured by the boiler temperature sensor 18+/−a first temperature variance TV1 for a first time period TP1. After the conclusion of the first time period TP1, the control logic 502 directs the boiler heater 12 to heat the source water 10 to a second temperature T2 as measured by the boiler temperature sensor 18+/−a second temperature variance TV2 for a second time period TP1, wherein T2>T2. After the conclusion of the second time period TP2, the control logic 502 directs the boiler heater 12 to further heat the source water 10 to a third temperature T3 as measured by the boiler temperature sensor 18+/−a third temperature variance TV3 for a third time period TP3, wherein T3>T2>T2. After a complete instantiation of the preheating gradient pattern Pdata as directed by the control logic 502, the first stream S1 proceeds from state S1*b* to the idle state R3, wherein the.

Independent of stream S1, the control logic 502 proceeds along a second stream S2 from the idle state R3 to an initial second stream state S2*a* to determine whether the boiler PTC temperature sensor 18 indicates that a highest boiler temperature level, i.e., exceeding the third temperature T3+the third temperature variance TV3, has been met or exceeded. When the boiler PTC temperature sensor 18 indicates to the control logic 502 during the initial state S2*a* that a maximum boiler preheating temperature level, e.g. T3+TV3, of the boiler system 2 is met exceeded, the controller proceeds back to the idle state R3. In the alternative, when the boiler PTC temperature sensor 18 indicates to the control logic 502 during the progressing second stream state S2*b* that the maximum boiler preheating temperature level, e.g. T3+TV3, of the boiler system 2 is met or exceeded, the control logic 502 directs the boiler heater 12 to further heat the source water 10 held within in the boiler system 2 to proceed to an expected boiling point temperature value BP of the source water 10, e.g., 212 F at sea level. When the control logic determines that the observed boiling point temperature OBP of the source water 10 diverges from the expected boiling point temperature value BP, the expected boiling point temperature value BP is revised to the observed boiling point temperature OBP. The observed boiling point temperature OBP measured at a time when the cycloid temperature sensor 38 indicates a rise of temperature of the cycloid condenser 32. The difference between the expected boiling point temperature value BP and the observed boiling point temperature OBP will then be added +/− to any stored gradient values of the temperature plateaus T1, T2, T3.

Independent of streams S1 and S2, the control logic 502 proceeds along a third stream S3 from the idle state R3 to an initial third stream state S3$a$, wherein the control logic 502 determines whether the boiler PTC temperature sensor 18 indicates that the boiler system 2 has exceeded a maximum safe boiler maximum temperature Bmax, e.g., 220F. It is understood that when the boiler temperature sensor 18 indicates that the boiler is above the boiler maximum temperature Bmax, the boiler system 2 is presumed to be at or below a desired minimum level of the source water 10 held in the boiler system 2. Accordingly, when the boiler temperature sensor 18 indicates that the boiler system 2 is at the boiler maximum temperature Bmax, the control logic 502 moves onto the progressing third stream state S3$b$ and (a) turns the boiler status LED 13 into a flashing alert mode, and (b.) turns off the boiler heater 12. Moving on from the progressing state S3$b$ to the succeeding third stream state S3$c$ the control logic 502 monitors the boiler temperature sensor 18 until the boiler temperature sensor 18 indicates that the boiler system 2 has cooled to below a safe handling temperature Bsafe of the boiler system 2. Once the safe handling temperature Bsafe, or a lower temperature, of the boiler system 2 is indicated, the control logic 502 proceeds onto the succeeding third stream state S3$d$ wherein the boiler status LED 13 is set by the control logic 502 into a solid lighting mode. The third logic stream S3 returns from the third stream state S3$d$ to the idle state R3.

Independent of streams S1, S2 and S3, the control logic 502 proceeds along a fourth stream S4 and determines in an initial fourth stream state S4$a$ if an event of the optional dispensing button 80 indicates that the dispensing button 80 is manually depressed or otherwise engaged occurs. When the control logic 502 determines in the initial fourth stream state S4$a$ that the dispensing button 516 has not been depressed or otherwise engaged, the control logic 502 returns to the idle state R3. In the alternative, when the control logic 502 determines in the initial fourth stream state S4$a$ that the dispensing button 516 is being depressed, the control logic 502 proceeds on to determine in a following fourth stream state S4$b$ whether the condenser temperature sensor 18 indicates that the water 54 condenser system is at or below a safe temperature dispensing level DTsafe. When the control logic 502 determines in the fourth stream state S4$b$ that the cycloid condenser 32 is not at or below the safe temperature dispensing level DTsafe, the control logic 502 proceeds on from the progressing fourth stream state S4$b$ to the idle state R3.

In the alternative, when the control logic 502 determines in the fourth stream state S4$c$ that the condenser cycloid condenser is at or below the safe temperature dispensing level DTsafe, the control logic 502 proceeds on to the succeeding stream state S4$c$ to determine whether or not the strain gauge scale control logic 502 indicates that the weight of the cycloid condenser 32 is above a minimal condenser dispensing weight level Wmin within the cycloid condenser 32. When the strain gauge scale control logic 502 does not indicate to the control logic 502 in the succeeding fourth stream state S4$c$ that the cycloid condenser 32 is above the Wmin level, the fifth stream S5 returns the control logic 502 to the idle state R3.

In the alternative, if the strain gauge scale 61 does indicate in the succeeding stream state S4$c$ to the control logic 502 that the weight of the cycloid condenser 32 is at or above the Wmin level, the control logic 502 proceeds from in the succeeding fourth stream state S4$c$ to a next fourth stream state S4$d$ and directs the dispensing button 80 to power on and the dispenser pump 78 the condensed water 52 from the cycloid condenser 32. The control logic 502 thereupon returns from next fourth stream state S4$d$ to the idle state R3.

Independently of streams S1, S2, S3, and S4 the control logic 502 proceeds along a fifth stream S5 and determines in an initial fifth stream state S5$a$ whether the dispensing pump 78 is presently pumping the condensed water 52 from the cycloid condenser 32. When the control logic 502 determines in the initial fifth stream state S5$a$ that the dispensing pump 78 is not pumping the condensed water 52 from the cycloid condenser 32, the controller returns to the idle state R3.

In the alternative, when the control logic 502 determines in the initial fifth stream state S5$a$ that the dispensing pump 78 is turned on, i.e., pumping the condensed water 52 from the cycloid condenser 32, the control logic 502 moves onto the progressing fifth stream state S5$b$ and determines whether the dispensing button 80 is released, i.e., not still manually engaged. When the control logic 502 in the progressing fifth stream state S5$b$ determines that the dispensing button 80 is released, the control logic 502 powers off the dispensing pump 78 in the next fifth stream state S5$c$ and proceeds back to the idle state R3. In the alternative, when the control logic 502 in the progressing fifth stream state S5$b$ determines that the dispensing button 118 is not released, the control logic 502 proceeds to return to the idle state R3 and does not turn off the pump 78.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the range's limits, an excluding of either or both of those included limits is also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a logic" or "a control logic" may include one or more logic circuits, or microprocessor or multiple processors. In some cases, a process that may be performed by "a processor" may be actually performed by multiple processors on the same device or on different devices. For the purposes of this specification and claims, any reference to "a logic", "a control logic", "a control circuit", or "a processor" shall include multiple processors, which may be on or within a same circuit, different circuits, a same device, or different devices the same device or different devices, unless expressly specified otherwise.

The subject matter may be embodied as circuits, control logic circuits devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Additionally, it should be understood that any transaction or interaction described as occurring between multiple logic circuits is not limited to multiple distinct devices, and could all be happening on the same circuit or device. It is understood in the art that a single control logic may host multiple distinct and separate server functions.

I claim:

1. A device comprising:
   a condensation element, the condensation element forming a cycloid surface, wherein the cycloid surface forms an increasingly large circle in an x-y plane as the cycloid surface extends in a downward direction along a z-axis, wherein the x-y plane is defined by an x-axis and a y-axis, and the x-axis, y-axis, and the z-axis are mutually orthogonal, and any condensation formed on the cycloid surface will tend to flow in a downward direction along the z-axis and along the cycloid surface;

a condenser vessel chamber configured to hold condensation received from the cycloid surface, and condenser vessel chamber having an input aperture, a condenser vessel wall, and a condenser vessel internal floor, and coupled with the condenser vessel wall, the internal floor comprising the input aperture, and the condenser vessel wall shaped and sized to at least partially accept and enclose the condensation element; and a source of steam coupled with the input aperture, whereby the steam flows upwards and makes contact with the cycloid surface.

2. The device of claim 1, further comprising:
   a boiler system comprising a boiler steam outlet, a heating element, a volume of water, and at least one volume of an effluent, the at least one volume of effluent (hereinafter, "effluent") having a lower boiling point than water, and the heating element configured to generate a volume of steam (hereinafter, "steam") by boiling the volume of water, and the boiler steam outlet positioned to allow the steam and the effluent to leave the boiler;

a tubing having a first tubing section, an effluent check valve, and a second tubing section, the first section coupled at a first end with the boiler steam outlet and adapted to receive the steam and the effluent from the boiler system, and the first tubing section coupled at a first valve end to the effluent check valve;

the effluent check valve configured to receive the steam and the effluent from the first tubing section enabling at least a first portion of the effluent to exit the tubing, and inhibiting the steam from exiting the tubing, the effluent check valve further coupled with the second tubing section and delivering steam and effluent remaining into the second tubing section; and the second tubing coupled to the effluent check valve at a second valve end and coupled to the input aperture at an input end, wherein the remaining steam and effluent is delivered into the condenser vessel chamber via the input aperture.

3. The device of claim 2, wherein the device further comprises:
   a strain gauge coupled to the condenser vessel chamber, the strain gauge configured to measure the combined weight of the condenser chamber vessel and the condensation, and inform a control logic of an indication of the combined weight;

the control logic communicatively coupled with the strain gauge and controllably coupled with the heating element, wherein the control logic is configured to direct the heating element to eliminate providing heat to the water and the effluent when the strain gauge indication meets or exceeds a preselected value.

4. The device of claim 2, further comprising:
   an output channel coupled with the condenser chamber vessel and an output valve, the output channel providing a channel for the condensation to exit the condenser vessel chamber; and the control logic controllably coupled with the output valve, whereby the control logic switched the output valve from an open to a closed state.

5. The device of claim 2, further comprising:

a boiler temperature sensor, the boiler temperature sensor communicatively coupled with a control logic and providing a boiler temperature indication to the control logic; and the control logic communicatively controllably coupled with the heating element, wherein the control logic is configured to direct the heating element through a temperature gradient on the basis of boiler temperature indications received from the boiler temperature sensor.

6. A device comprising:

a condensation element, the condensation element forming a cycloid surface, wherein the cycloid surface forms an increasingly large circle in an x-y plane as the cycloid surface extends in a downward direction along a z-axis, wherein the x-y plane is defined by an x axis and a y axis, and the x-axis, y-axis, and the z-axis are mutually orthogonal, and any condensation formed on the cycloid surface will tend to flow under the influence of a gravitational force in a downward direction along the z-axis and along the cycloid surface, wherein the condensation element further comprises a condensation wall extending from the cycloid surface and downward along the z-axis;

a condenser vessel chamber configured to hold condensation received from the condensation element, and the condenser vessel chamber having an input, a condenser vessel wall, and a condenser vessel bottom coupled with the condenser vessel wall, the condenser vessel wall shaped and sized to at least partially accept and enclose the condensation element, and wherein the condenser vessel wall forms an oversize inner radius along the x-y plane, the oversize inner radius being within the range 0.01% to 10% larger than an external radius of the condensation wall within the x-y plane; and a source of steam coupled with the input aperture, whereby the steam flows upwards and makes contact with the cycloid surface.

7. The device of claim 6, further comprising an inlet channel, the inlet channel coupled with the input aperture and configured to deliver a gas stream into the condenser vessel chamber.

8. The device of claim 7, wherein the gas stream comprises steam.

9. The device of claim 7, wherein the gas stream comprises water vapor and at least one effluent, wherein the concentration of the at least one effluent varies over a temperature range.

10. The device of claim 7, further comprising a fan, wherein the fan is configured and positioned to cool the condensation element.

11. The device of claim 7, wherein a condensation peltier device is comprised within the condensation element.

12. The device of claim 10, wherein the fan is oriented to blow air toward the cycloid surface, and the fan is coupled with the condensation element.

13. The device of claim 12, wherein the fan comprises at least one cooling fin extending along the z-axis toward away from the cycloid surface.

14. The device of claim 13, wherein the fan further comprises a plurality of cooling fins extending along the z-axis away from the cycloid surface.

15. The device of claim 6, wherein the condenser vessel wall forms an internal radius normal to the z-axis, and the internal radius is equal to or greater than a largest cycloid internal radius of the cycloid surface within the x-y plane.

16. The device of claim 6, further comprising:

a control module communicatively coupled with both the height sensor and a control valve, and the control module configured to switch the control valve from an open state to a closed state upon receipt of the height signal from the height sensor; and a source of gas, the source of gas coupled with the inlet channel, wherein the control valve is disposed between the condenser vessel chamber and the source of gas, and whereby the gas then flows through the inlet channel when the control valve is in the open state, and the gas is impeded from flowing into the condenser vessel chamber when the control valve in the closed state.

17. The device of claim 16, wherein the source of gas comprises a boiler.

18. The device of claim 17, further comprising a temperature sensor, the temperature sensor configured and adapted to detect a temperature of the device and thereupon generate an overheat signal when the device is at or higher than a predetermined temperature.

19. The device of claim 17, further comprising:

a control module communicatively coupled with both the temperature sensor and a control valve, and the control module configured to switch the control valve from an open state to a closed state upon receipt of the overheat signal from the temperature sensor; and a source of gas, the source of gas coupled with the inlet channel, wherein the control valve is disposed between the condenser vessel chamber and the source of gas, and whereby the gas then flows through the inlet channel when the control valve is in the open state, and the gas is impeded from flowing into the condenser vessel chamber when the control valve is in the closed state.

20. The system of claim 6, further comprising an effluent egress channel formed between the condensation wall and the condenser vessel wall, whereby a volume of effluents received into the via the input aperture rise above the cycloid surface without condensing thereon, wherein at least a portion of the effluents exit the system via the effluent egress channel.

* * * * *